June 5, 1962 P. Z. RIDER 3,038,023

AUTOMATICALLY CONTROLLED TAPE PERFORATOR

Filed Jan. 10, 1955 6 Sheets-Sheet 1

INVENTOR
PAUL Z. RIDER

BY John L Sterling

ATTORNEY

June 5, 1962 P. Z. RIDER 3,038,023

AUTOMATICALLY CONTROLLED TAPE PERFORATOR

Filed Jan. 10, 1955 6 Sheets-Sheet 2

INVENTOR
PAUL Z. RIDER

BY J. L. Sterling

ATTORNEY

June 5, 1962 P. Z. RIDER 3,038,023

AUTOMATICALLY CONTROLLED TAPE PERFORATOR

Filed Jan. 10, 1955 6 Sheets-Sheet 3

INVENTOR
PAUL Z. RIDER
BY Jh L Sterling
ATTORNEY

AUTOMATICALLY CONTROLLED TAPE PERFORATOR

Filed Jan. 10, 1955 6 Sheets-Sheet 4

INVENTOR
PAUL Z. RIDER
BY J. L. Sterling
ATTORNEY

INVENTOR
PAUL Z. RIDER
BY John L Sterling
ATTORNEY

AUTOMATICALLY CONTROLLED TAPE PERFORATOR

Filed Jan. 10, 1955 6 Sheets-Sheet 6

INVENTOR
PAUL Z. RIDER
BY [signature]
ATTORNEY

3,038,023
AUTOMATICALLY CONTROLLED TAPE PERFORATOR
Paul Z. Rider, Stamford, Conn., assignor to Sperry Rand Corporation, a corporation of Delaware
Filed Jan. 10, 1955, Ser. No. 480,721
8 Claims. (Cl. 178—2)

This invention relates to the recording of data and more particularly to the encoding of signals representing data entered in the keyboard of a data recording machine such as a typewriter or the like and transmitting said data to a tape perforator.

Heretofore, the means used for encoding data entered in the business machine has been cumbersome due to the fact that it usually relied upon a large number of mechanically operated contacts, relays and/or vacuum tubes.

It is the principal object of this invention to provide a simple, inexpensive and easily installed encoding circuit on the ordinary office type of electric business machine whereby data entered on the keyboard will be entered in a perforated tape.

It is another object of the invention to provide a circuit containing a matrix and an amplifier for each index position of the code, whereby circuits through the matrix are increased in potential to directly operate the perforator magnets.

It is still a further object to provide the necessary control and interlock circuits to automatically shift when the character changes from a letter to numeral and vice versa.

It is another object to provide an interlocking circuit whereby it is insured that the keyboard of the business machine will be ineffective should the tape perforator fail in any manner.

It is a further object to provide automatic machine operation signals.

The invention is herein shown in an embodiment particularly adapted for use with a standard type of electric typewriter, and it will of course be understood that by reference to a typewriter throughout the following specification and claims it is intended to embrace all equivalent apparatus having a keyboard operable for recording or transcribing data. A feature of the invention is the combining of a contact stack of small proportions under the type action of the typewriter, with a neon matrix mounted on the back of the typewriter in such a manner that the typewriter can then be connected directly to a tape perforator for recording data entered in the typewriter keyboard in the tape in printing telegraph code.

A more clear conception of the operation, further objects and construction of the invention may be had from the following specification when read in conjunction with the accompanying drawings in which.

The invention is applied to the normal office type of electric typewriter in which the operation of a key brings a cam into cooperation with a constantly rotating drive roll, said cam then continuing the operation of the key mechanism to operate a type bar to effect printing or machine operations such as carriage return, etc.

Figure 8:
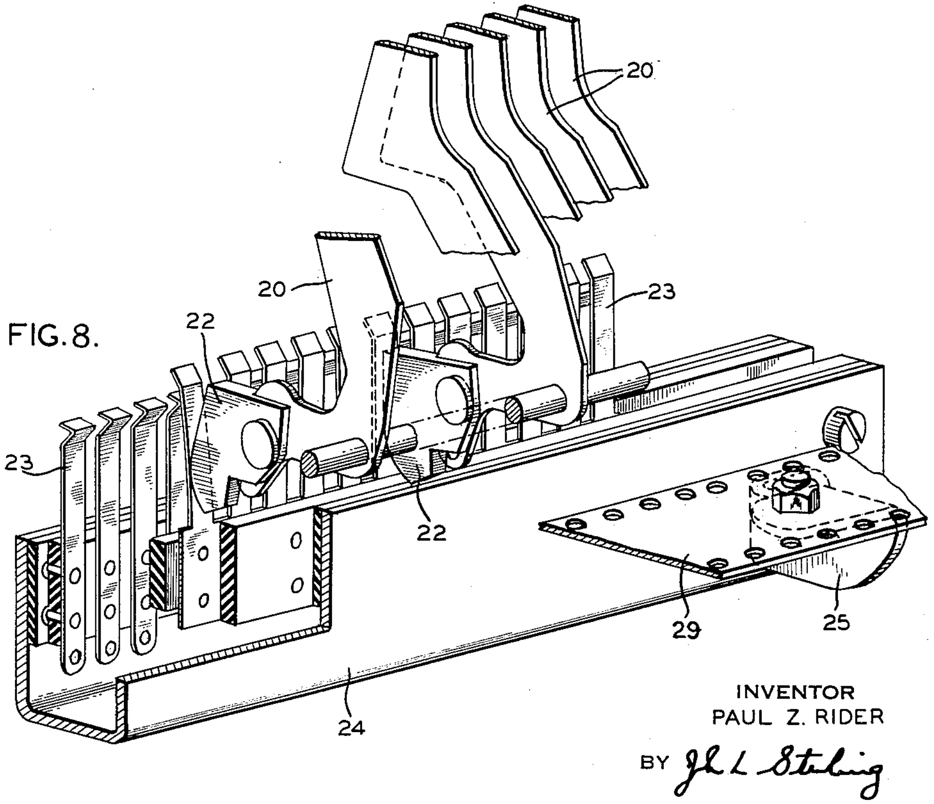
FIG. 8 is an isometric of the contact bank under the type action of the typewriter.

Mounted below the type action (FIGS. 2 and 8) is a stack of contacts, one for each key, and the type bar bell crank for each key has a phenolic cam secured thereto which closes the associated contact upon depression of the key. This contact is wired through a neon matrix in accordance with the character of the key depressed and said matrix is in turn wired to an amplifier circuit through which the pulses from the contact passing through the neon matrix are amplified to actuate the magnets of a tape perforator.

Figures 1, 5:
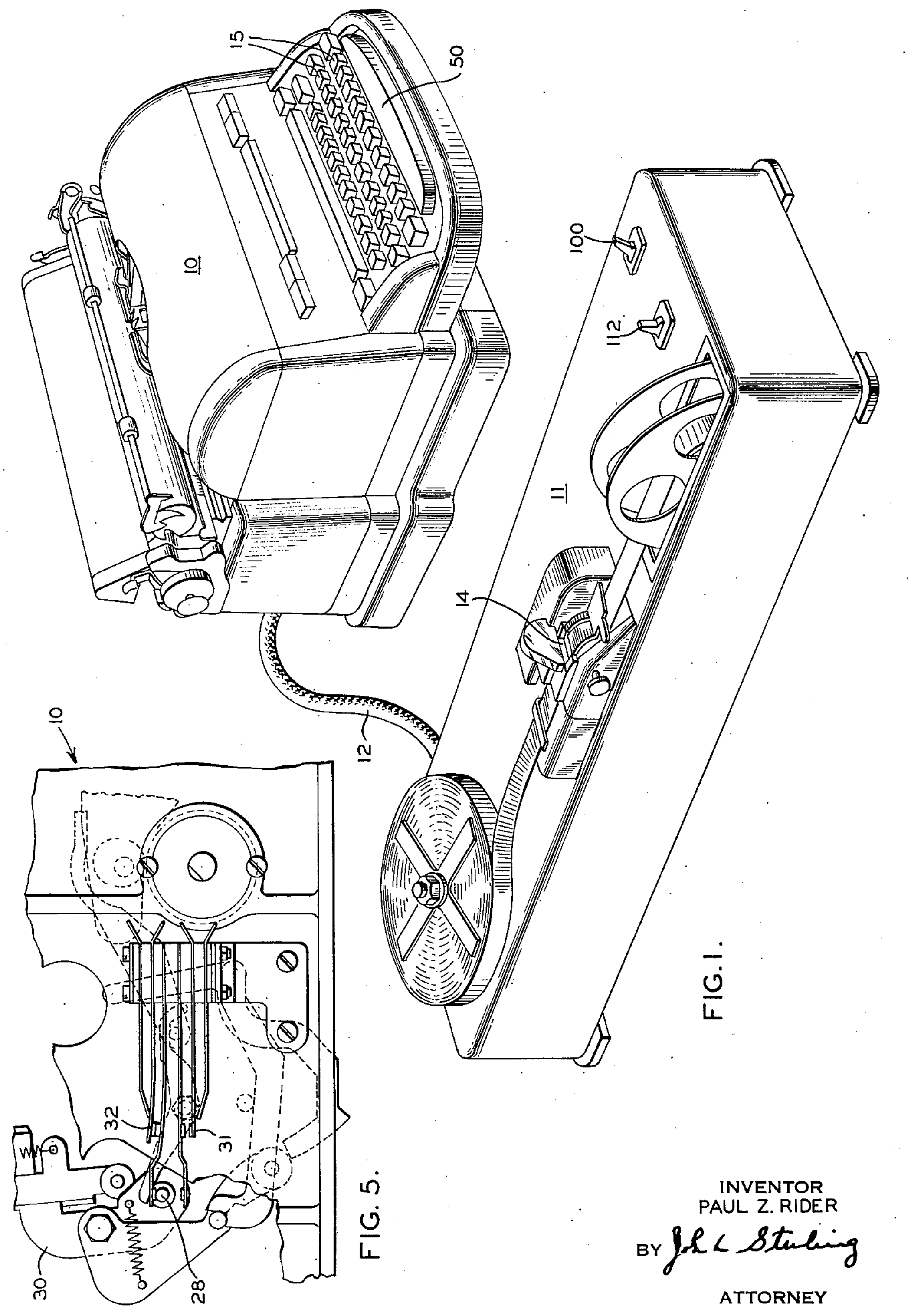
FIG. 1 is an isometric view of the typewriter and recording punch.
FIG. 5 is a detail portion of the side of the typewriter showing the case shift mechanism and the associated letter and alpha shift contacts.
Figures 2, 6:
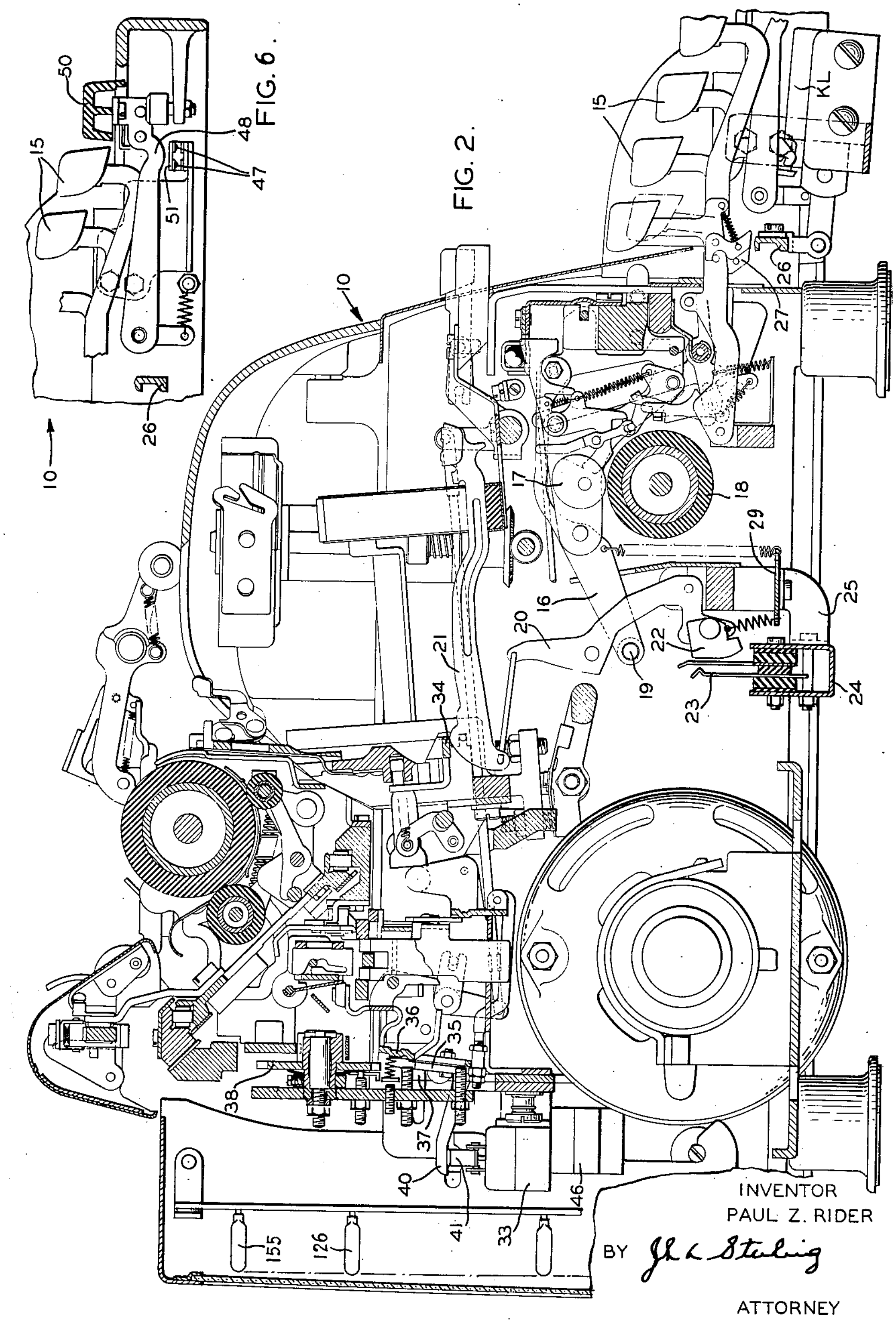
FIG. 2 is a cross section through the typewriter showing the different controls in place.
FIG. 6 is a detailed view of the space bar and associated contacts.
Figure 4:
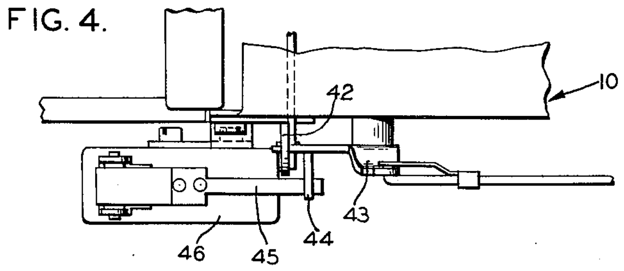
FIG. 4 is a plan view of a portion of FIG. 3.
Figure 9:
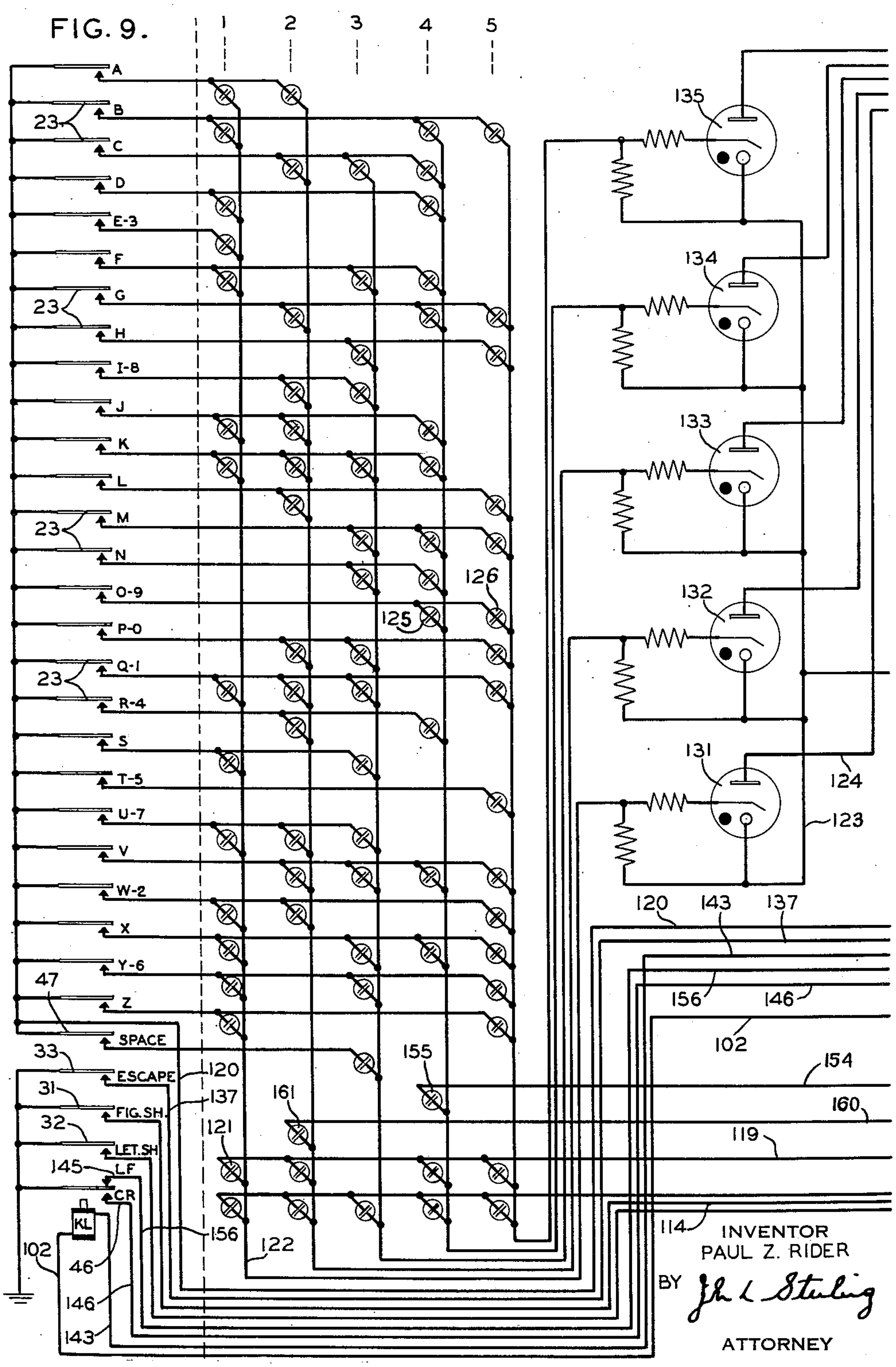
FIGS. 9 and 10, when combined, form a schematic diagram of the electrical circuit used in the invention.
Figure 10:
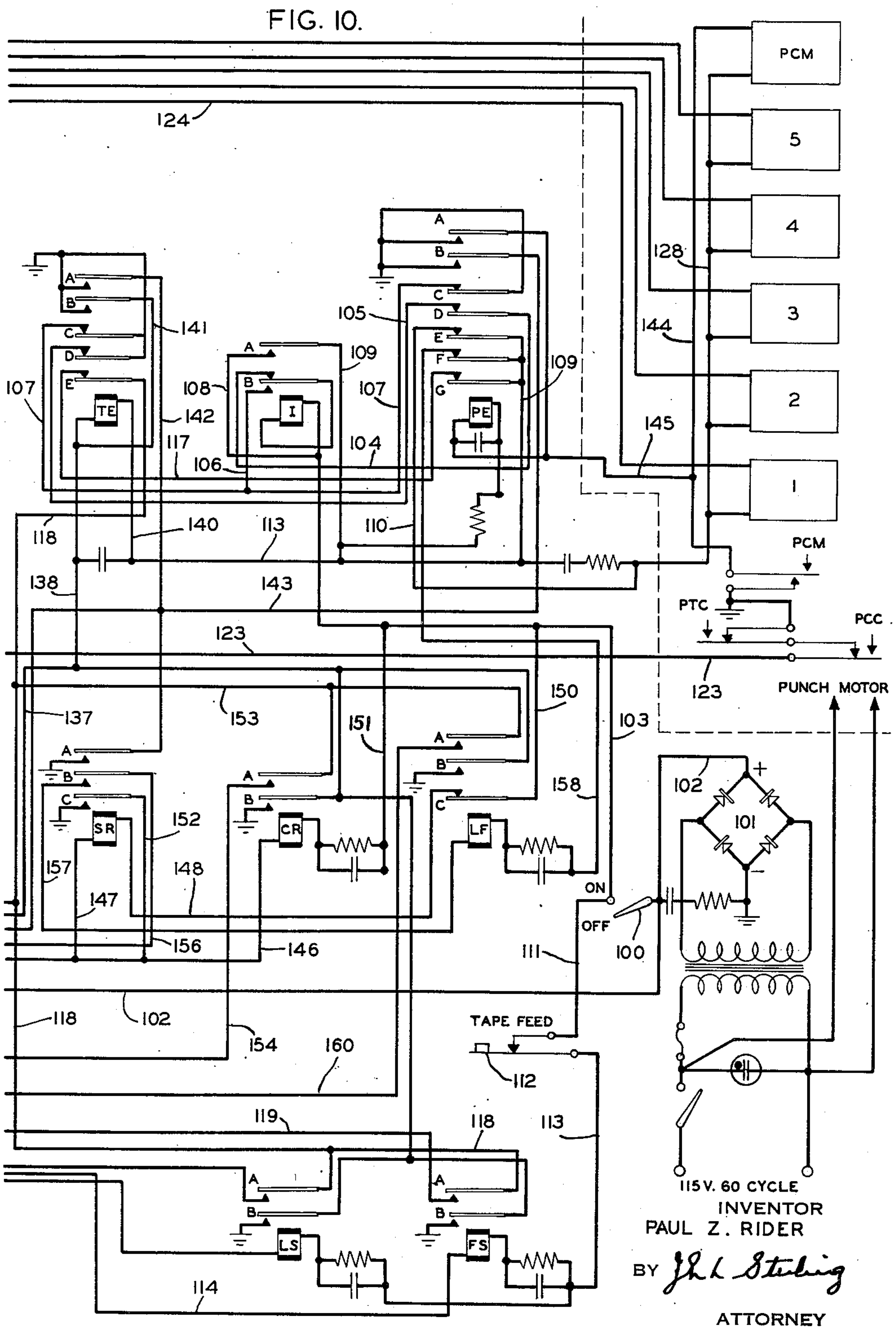

As shown in FIG. 1, the typewriter 10 is connected to the perforator 11 by a cable 12. The perforator is of any normal type in which magnets operate punches rising through a die 14 to perforate the tape. The tape is also fed in the usual manner by means of a sprocket feed. Most of the circuitry outside of the matrix, shown in FIG. 9, is mounted within the casing of the perforator 11. The neon matrix is mounted on the rear of the typewriter 10. Only those portions of the typewriter necessary for description of the invention will be described, since a typewriter similar to that disclosed in the cross section of FIG. 2 is disclosed in the U.S. Patents 2,289,531, 2,326,312, 2,579,763 and 2,638,199. Portions of the conventional Remington typewriter, such as shown in the aforementioned patents, are illustrated in FIG. 2 and include base and parallel side frames which are connected at desired points by transversely extended bars on which are supported the principal operating mechanisms of the typewriter including the type action and key levers and the power drive.

Upon operation of a letter or alpha key 15 the power arm 16 is tripped in such a manner as to bring the eccentric disc 17 into contact with a continuously rotating power roll 18 thereby rotating the power arm clockwise thus rocking the pin 19 upwardly and rotating the type bar bell crank 20 in a clockwise direction about its pivot to rock the type bar 21 in a counterclockwise direction. This brings the type into contact with the paper on the platen at the printing line, as fully described and disclosed in the U.S. Patent 2,638,199. Secured to the type bar bell crank 20 (FIG. 8) is an insulated finger 22 preferably of a dielectric plastic which is adapted to close an associated contact 23. This contact is one of a plurality mounted adjacent to the type bar bell cranks and are carried in a U-shaped member 24 secured by brackets 25 to a cross member 29 of the machine. These contacts close circuits through a matrix for operating the perforator, as will be described more in detail later.

There is an interlock circuit for controlling the operations between the typewriter and punch, whereby the machines are maintained in synchronism. This circuit controls a "Keyboard Lock" solenoid KL (see FIGS. 2, 7, and 9). If either the typing cycle or punching cycle is not completed the "Keyboard Lock" solenoid fails to unlock the keyboard. The solenoid KL, as shown in FIG. 2, is connected to a bail 26 rockably mounted between the main frames of the typewriter and when in locked position, as is shown in FIG. 2, is positioned below feet 27 rotatably secured to the stems or bar of keys 15.

In the code for controlling the printing telegraph (which is the code used in this invention) a figure shift or letter shift signal precedes any change from alpha to numeric or from numeric to alpha punching. The standard printing telegraph keyboard is so arranged that the numerals are upper case characters of certain alpha keys. Thus in order to type a numeral the segment must be shifted to upper case. As shown in FIG. 5, two normally open contacts are mounted on the side of the typewriter frame and are engaged by a stud 28 secured to the left-hand side of the type segment 30. When the segment is shifted to upper case, as disclosed in Patent No. 2,289,531, the stud closes the lower contacts 31 and if the segment is in normal position, i.e., lower case, the upper contact 32 is closed, as shown. The closure of either of the contacts 31 or 32 completes a circuit to a relay, which in turn closes a circuit through the matrix and enters the code for either figure shift or letter shift in the tape, as will be described in detail.

The typewriter is also provided with an escape contact (see FIG. 3) in the form of a microswitch 33 which is actuated by the escapement mechanism each time the typewriter carriage escapes to the left.

Figure 3:
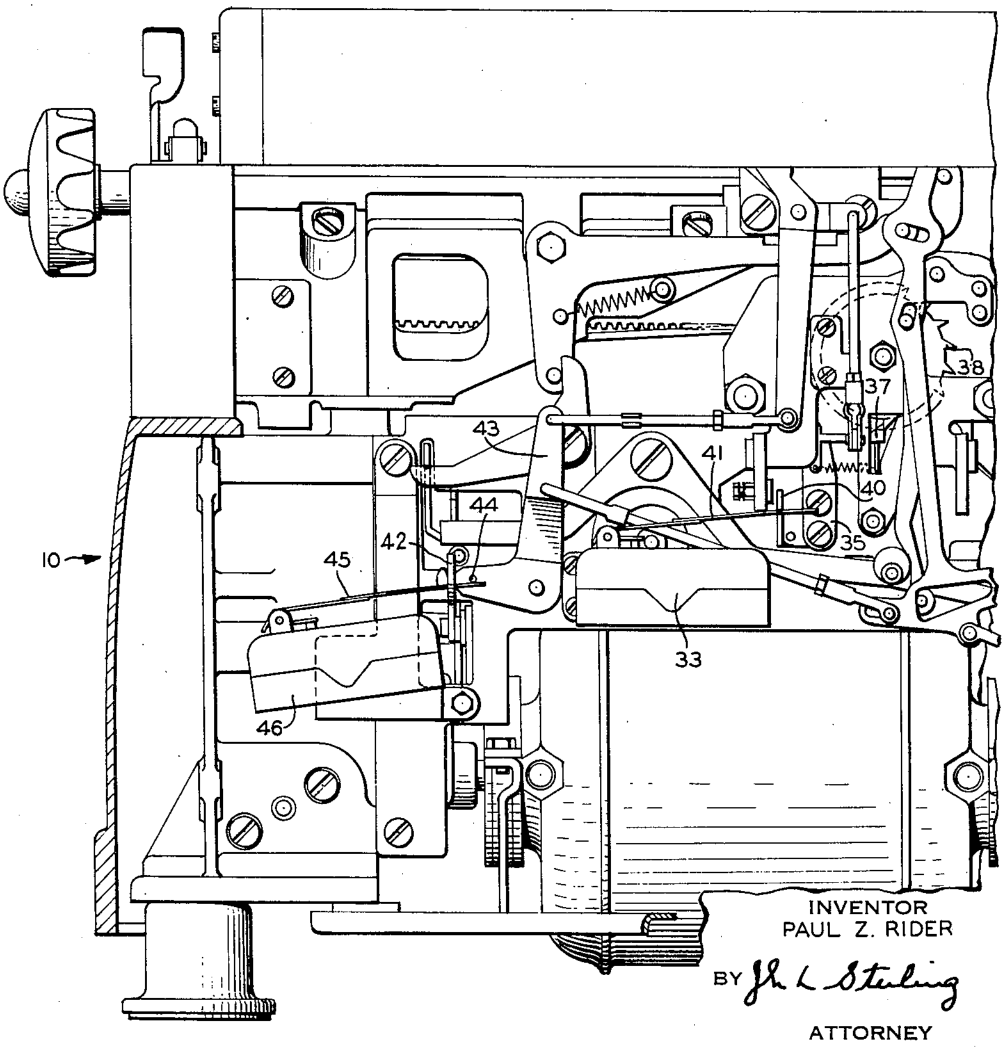
FIG. 3 is the rear of a typewriter showing the carriage return and escapement controls.

As is well known in this type of electric typewriter, the type bar 21, as it is thrown into position to type, is adapted to actuate a universal bar 34. The universal bar in turn acts through a series of links and bell cranks to oscillate an escapement rocker 35 carrying a holding pawl 36 and a stepping pawl 37 into engagement with the escapement wheel 38. The carriage is spring biased toward the left by a tape secured thereon and wound on a spring driven drum. In view of the fact that this is described in detail in such patents as 2,326,312 and 2,579,763, only those parts necessary for an understanding of the invention have been described. An arm 40 is secured to a rocker member 35 and is formed with a cam face adapted to cooperate with the actuating lever 41 of a microswitch 33 mounted on the back of the machine, as shown in FIG. 3. When the rocker arm 35 is oscillated by the universal bail 34, the arm 40 is depressed pushing down the lever 41 of the microswitch 33 thereby closing a circuit for effecting the operation of the "Typewriter Escape" magnet TE, as will be described later.

As is well known in this type of machine, the carriage is returned to the left margin or right-hand side of the machine by mechanical means under control of the keyboard. The carriage return operation is by direct drive from the power roll 18, which is geared to a clutch on a tape drum which, when the carriage return key is operated, actuates the clutch to connect the power roll to the tape drum thereby drawing the carriage to the right. None of this mechanism has been shown in detail as it is well known to return a carriage by power means. In FIG. 3 is shown the linkage for operating the carriage return mechanism, which linkage extends from the power arm of the carriage return key and includes bell cranks 42 and 43. A pin 44 is secured in bell crank 43 and is adapted to cooperate with the actuating lever 45 of the microswitch 46 in such a manner that when the carriage return key is operated the bell crank 42 is rocked clockwise. This rocks the bell crank 43 counterclockwise thereby depressing the lever 45 by means of pin 44 and actuating the microswitch 46 to actuate the "Line Feed Storage" relay SR and the "Carriage Return" relay CR preparatory to entering a line feed signal automatically in the tape, as will be described hereinafter.

Figure 7:
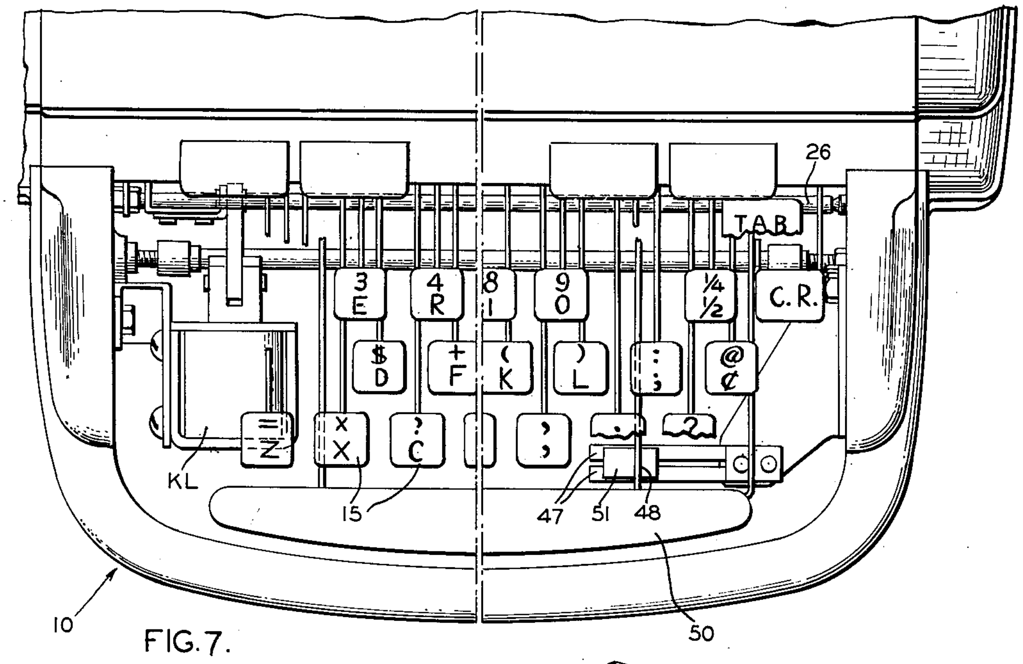
FIG. 7 is a view of the underside of the keyboard showing the key lock and spaced contacts.

As shown in FIGS. 6 and 7, a contact 47 is mounted directly below one of the arms 48 of the space bar 50. The contact is provided with an insulated plate 51 so that upon operation of the space bar a circuit is closed to punch a space signal in the tape.

When the "On-Off" switch 100 is actuated a circuit is closed from the positive side of the rectifier 101, over lead 102, through the switch, over lead 103, through the winding of the "Interlock" relay I, through its own break contact B, over lead 104, contact D of the "Punch Escape" relay PE, over lead 105, contact D of the "Type Escape" relay TE to ground or negative current, operating relay I. It is noted herewith that the negative side of rectifier 101 is grounded, therefore, in the following description all references to ground will be considered equivalent to negative voltage. Relay I locks up over a pair of circuits extending from positive lead 103 through its winding and make contact B, and over leads 106 and 107, one of said circuits extending through contact C of the "Punch Escape" magnet PE, the other circuit extending through contact C of "Typewriter Escape" relay TE to ground, thus holding the relay operated under control of both the punch and typewriter.

The operation of relay I connects positive current to the punch over circuit from leads 103 and 108, contact A of relay I (now closed), lead 109 to break contacts E, F and G of the "Punch Escape" magnet PE. The circuit through contact E extends over lead 110 which is common to all of the punch magnets. The circuit through contact F connects positive voltage to the "Line Feed" relay LF, as will be described and the circuit through contact G connects positive voltage to the contacts 23 under the typewriter keys.

The closure of the "On-Off" switch 100 also completes a circuit from positive lead 102, through the switch, over lead 111, through the contacts of the tape feed key 112, over lead 113, through the resistance condenser and winding of "Figure Shift" magnet FS, over lead 114, through the figure shift contact 31 to ground or negative voltage, thus operating the "Figure Shift" magnet. This circuit is effective if the type basket is in the upper case, as described above, and will effect the perforation of the figure shift code in the tape as follows. A circuit is closed from positive leads 103 and 108, through contact A of magnet I, over lead 109, through contact G of the relay PE, over lead 117, through contact E of relay TE, over leads 118 and 120, the latter lead being common to all of the key contacts associated with the typewriter keys. Lead 118 also extends to the contact A of the "Figure Shift" magnet and since this magnet is operated the contact A is closed and a circuit is completed over lead 119 to the four neon lamps in the matrix which correspond to the code for the figure shift. This circuit then extends over the four leads to the associated power amplifier tubes 131, 132, 134 and 135 which are of the cold cathode glow discharge type. Since all of these circuits are identical only one will be described. The positive current flowing through lead 119, as described above, passes through a neon lamp 121 and thence over leads 122 and 123 and through the contacts PCC and PTC in the punch. This circuit ionizes the tube 131 in this particular circuit and passes a signal over lead 124 to the winding of the one punch magnet and thence over lead 128 through contact E of relay PE, over lead 109 to positive voltage, as described heretofore, thus operating the punch magnet 1. In the case of the figure shift, the magnets 1, 2, 4 and 5 are operated. Immediately upon the operation of the punch magnets in either case the PCM contact is closed to energize the PCM magnet so as to complete a punching and tape feeding cycle during the course of which the PCC contact is opened, thus deenergizing the tubes that have been actuated and returning the circuit to normal.

When a typewriter key 15 is depressed, its associated contact 23 is closed. For example, if the 9 key is actuated, then the O-9 contact 23 is closed completing a circuit from positive lead 120 through the contact and thence through the neon lamps 125 and 126, thus closing circuits to the tubes 134 and 135 and actuating the punch magnets 4 and 5, as described above with regard to the figure shift signal.

When the typewriter key was depressed the carriage escaped one letter space in the usual manner, thus closing the escape contact 33, as described heretofore, and completing a circuit from ground through the escape contact, over leads 137 and 138, through the winding of the relay TE, over leads 140, 113 and 109, contact A of relay I, leads 108 and 103 to positive voltage, thus operating the relay. Relay TE locks up over a circuit from positive lead 103, over lead 108, through contact A of relay I, leads 109, 113 and 140, winding of relay, lead 141, contact B of the same relay to ground. The operation of relay TE opens the circuit described above supplying positive voltage to the key contacts through its contact E and at its contact C it opens one locking circuit for the interlocking relay I. This relay does not release, however, as it is still locked up through contact C of the relay PE. The operation of relay TE also closes a circuit from ground through its contact A, leads 142 and 143, through winding of "Key Lock" solenoid KL, lead 102 to positive side of rectifier 101 operating the "Key Lock" solenoid KL to lock up the keys of the typewriter.

Simultaneously with the operation of any one of the punch magnets 1–5, the PCM contact in the punch is closed completing the punching cycle as above mentioned and also closing a circuit from ground through the PCM contact, over lead 145, through the winding of the punch escape relay PE, over lead 109, through the contact A of the interlock relay I, which at this particular moment has not been released, over leads 108 and 103 to positive voltage. The operation of the relay PE, at its contact G, opens the positive circuit to the neon lamps as did the contact E of the relay TE. At its contact E it also opens the circuit over lead 109 which supplied positive current to the punch magnets thereby preventing their further operation. The closure of the PCM contacts, however, first closes a circuit from ground through the contact, lead 144, through the PCM magnet over lead 128, through contact E of relay PE to positive voltage over lead 109. This causes the punch to be cycled and thereby the tape to be fed.

Thus it is seen that upon operation of a typewriter key, certain punch magnets are operated, the escape contact 33 is closed operating the "Typewriter Escape" relay TE preventing any further operation of the typewriter and immediately upon energization of any magnet 1–5 in the punch, the PCM contacts in the punch are closed effecting completion of a punch cycle and operating the "Punch Escape" relay PE preventing any further operation of the punch until the "Interlock" relay I has first been released by the opening of its locking circuit at contacts C of both of the relays TE or PE. The release of the relay I removes positive voltage at contact A from the operating circuits of relays TE and PE, thus causing them to release and again establish the operating and locking circuits of relay I and permit further entry of data.

When the "Carriage Return" key of the typewriter is depressed, its associated contact 46 is closed completing a circuit from ground over leads 146 and 147, through the winding of the "Line Feed Storage" relay SR, over lead 148, through contact C of the "Line Feed" relay LF, leads 150 and 103 to positive voltage, thus operating relay SR. A parallel circuit is also closed from lead 146 through the winding of the "Carriage Return" relay CR, over leads 151 and 103 to positive voltage, thus operating relay CR.

Both relays are locked up over a circuit from ground on the contact C of relay SR. The locking circuit for relay SR extends from ground through contact C of the relay SR, leads 152 and 147, winding of the relay, lead 148, contact C of relay LF, leads 150 and 103 to positive voltage. The locking circuit for relay CR extends from ground, contact C of relay SR, leads 152 and 146, through the winding of relay CR, leads 151 and 103 to positive voltage.

The operation of the CR relay closes a circuit from positive lead 118, over lead 153, contact A of the relay, lead 154, through neon lamp 155 ionizing the tube 134 and actuating punch magnet 4, to enter a "Carriage Return" signal in the tape. The operation of the relay CR actuates the "Typewriter Escape" relay TE from ground on its contact B, thus removing positive current from the typewriter key contacts 23 and preventing entry of data during carriage return.

When the carriage return is completed and the carriage reaches the left margin, as described above, the "Carriage Return" contact 46 is restored to normal closing a circuit from ground through the "Line Feed" contact 145, over lead 156, contact B of relay SR, lead 157, through winding of "Line Feed" relay LF, resistor condenser combination, lead 158, contact F of relay PE, over lead 109, contact A of relay I, over leads 108 and 103 to positive voltage. This operates the line feed relay LF opening the operating circuit for relay SR at contact C, thus permitting it to release. The "Typewriter Escape" relay TE is actuated through contact B of relay LF preventing the operation of the typewriter and a circuit from positive lead 118 is closed over lead 153, contact A of relay LF, lead 160, through neon lamp 161, thus actuating amplifier tube 132 and actuating punch magnet 2 to enter a line feed signal.

The tape feed key 112 is used for feeding a leader for the tape and effects a letter or number shift signal in the tape each time the key is depressed.

The "Carriage Return," "Line Feed," "Letter Shift" and "Figure Shift" relays are pulse operated relays. These are recognized by the resistor condenser combination in series with the winding. When current is applied to such a relay, it will energize because of the charging current of the condenser. When the condenser is fully charged, charging current ceases to flow, and because the resistance in series with the coil is high, the relay cannot remain energized. Therefore, if an actuating contact is closed and remains that way, the relay momentarily energizes and then deenergizes. In order to energize the relay again, the condenser must be first discharged by opening the circuit.

If at any time the keyboard remains locked because of failure of the interlock cycle opening the punch "On-Off" switch will release the interlock.

It will be seen that the interlock circuit for control of the typewriter by the punch and vice versa operates as follows. When the punch "On-Off" switch is set to the "On" position, positive voltage is applied to the "Interlock" relay I. Since negative voltage is already applied to the normally closed side of the make before break contact B of relay I in series with normally closed contacts on the "Typewriter Escape" and the "Punch Escape" relays, the "Interlock" relay energizes. The A contact of the "Interlock" relay I supplies positive voltage to the "Typewriter Escape" and "Punch Escape" relays TE and PE and to the punch magnets. The B contact of the relay I locks up that relay through two parallel normally closed contacts, one on relay TE and one on relay PE. When a typewriter key is depressed, the typewriter prints and escapes actuating the "Escape" contact in the typewriter. This supplies negative voltage to relay TE which energizes and locks through its B contact. The E contact of this relay upon opening extinguishes whatever neons in the matrix are ionized. By the time this happens the neons have already ionized the tubes 131 to 135 inclusive and are no longer needed. The contact C of relay TE upon opening removes one of the two parallel lock circuits of the interlock relay. The A contact upon closing energizes the "Keyboard Lock" solenoid to lock the typewriter keyboard thereby preventing the operator from depressing another key until the present typing and punching cycles are completed.

When a typewriter key 15 was depressed, an associated row of neons, such as 126, 127, 155 or 161, was ionized which in turn ionized the corresponding tubes 131 to 135 inclusive, which tubes in turn energize the corresponding punch magnets 1 to 5 in the punch. This actuated PCM contact of the punch which energized the PCM magnet to start the perforating and tape feed portion of the punching cycle and also energize the "Punch Escape" relay which locks through its contact A. The energization of the "Punch Escape" relay is somewhat delayed by the condenser across its coil. Once the perforating portion of the punching cycle has begun, the PCC contact in the punch extinguishes the amplifier tubes 131 to 135 inclusive and deenergizes the punching magnets. The contact G of relay PE acts the same as the contact E of relay TE. The contact E or punch positive contact deenergizes the PCM magnet. The keyboard lock contact B on the punch escape relay PE acts the same as the keyboard lock contact A of relay TE. The interlock contact C on relay PE removes the last lock circuit of the "Interlock" relay I. This causes relay I to deenergize. This in turn removes positive voltage at contact A from the relays TE and PE causing them to be deenergized. When both these relays are deenergized, the negative circuit of the "Interlock" relay is reestablished from ground on relay TE through its contact D, over lead 105, to contact D of relay PE, over lead 104, through the break contact B of the "Interlock" relay, through its winding to lead 103 to positive side of the line. Also when both relays are deenergized, the "Keyboard Lock" solenoid KL no longer receives negative voltage from contacts B of either the "Type Escape" or "Punch Escape" relays. The keyboard is then free and the operator can then depress the next typewriter key.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth and as hereinafter claimed.

What I claim as new and desire to secure by Letters Patent is:

1. In a typewriter-perforator combination, an interlocking circuit for insuring that said typewriter is ineffective until an operating cycle of said perforator is completed, said circuit including a relay controlled by the escapement mechanism of the typewriter and a relay controlled by a mechanical movement of said perforator, each of said relays including contacts independently connected upon operation of the associated relays for locking up the keyboard of the typewriter, each of said relays also including contacts arranged in parallel circuits and effective for momentarily interrupting the power supply to each of said relays after both of said relays have been operated.

2. In a typewriter-perforator combination, an interlocking circuit for insuring that said perforator is ineffective until an operating cycle of said typewriter and said perforator is completed, said circuit including keyboard locking means, a relay controlled by the escapement mechanism of the typewriter, a relay controlled by a mechanical movement of said perforator, and an inter-lock relay for controlling the power supply to said first two mentioned relays, each of said relays having self locking means for maintaining the respective relay operated, the self locking means for said inter-lock relay comprising parallel circuits each completed through normally closed contacts of said first two mentioned relays, each of said first two mentioned relays having contacts effective upon operation of the respective relay for completing a circuit to said keyboard locking means, whereby the keyboard of said typewriter is locked upon operation of either of said first two mentioned relays and is unlocked only after operation of both said first two mentioned relays.

3. In a typewriter-perforator combination, a typewriter carriage, means for returning said carriage to an initial writing position, means for feeding paper in said carriage vertically, a circuit comprising three relays wherein two of said relays are actuated upon receipt of a carriage return signal and one of said pair of relays being adapted to store said signal until said carriage return is completed at which time the third relay is actuated by a pulse from said storage relay to enter a vertical feed signal in said tape.

4. In a typewriter-perforator combination, a typewriter carriage, a tape feed, escapement means for letter spacing said carriage, means for actuating said tape feed, an interlock circuit comprising three relays, one of said relays operating under control of said escapement means, the second of said relays operating under control of said tape feeding means, and said remaining relay controlling the power supply to said typewriter and perforator and being operated and locked up through the contacts of both of said other relays in such manner as to insure that each typing and perforating cycle is complete.

5. In combination, a typewriter, a tape perforator, encoding circuit completing means associated with the keyboard of said typewriter and comprising individual single contacts for corresponding individual keys of said keyboard, a neon matrix interconnecting said contacts and the punches of said perforator, said matrix including an input line for each of said contacts and an output line for each of said punches, the neon elements of said matrix selectively connecting the input lines with the output lines thereof, and an interlock circuit comprising three relays, one of said relays operating under control of said typewriter, the second of said relays operating under control of said perforator, and said remaining relay controlling the power supply to said keyboard contacts and the punches of said perforator and being operated and locked up through the contacts of both of said other relays in such manner as to insure that each typing and perforating cycle is complete.

6. In combination, a key operable data recording machine, a tape perforator, encoding circuit completing means associated with the keyboard of said machine and comprising individual single contacts for corresponding individual keys of said keyboard, a power supply in circuit with said contacts and said perforator, and a neon matrix interconnecting said contacts and the punches of said perforator, said matrix including individual output lines relating to each of said punches and individual input lines for each of said contacts, the neon elements of said matrix selectively interconnecting said input lines with said output lines for encoding the character of each key into electrical signals adapted to actuate said perforator.

7. In combination, a key operable data recording machine, a tape perforator, encoding circuit completing means associated with the keyboard of said machine and comprising individual single contacts for corresponding individual keys of said keyboard, a power supply in circuit with said contacts and said perforator, an encoding circuit comprising a neon matrix having a plurality of channels, each channel connected through an amplifier to a punch magnet in said perforator, said matrix including a separate input line for each of said contacts, the neon elements of said matrix selectively interconnecting said input lines with said channels in accordance with the code representation of the associated key, and a relay under control of mechanical functions of said machine for making said matrix ineffective.

8. In coding apparatus to energize selectively information transfer means, the apparatus adapted to be employed with key operated mechanisms containing a dual function key and character keys, a code strip formed by a plurality of code stacks responsive to energization for producing first code signals, means for selectively energizing each of the code stacks in response to actuation of an associated character key for generating the first code signals, means for energizing the information transfer means in accordance with the first code signals, means responsive to actuation of the dual function key for generating second and third code signals, and means for energizing the information transfer means in accordance with the second and third code signals.

References Cited in the file of this patent

UNITED STATES PATENTS

| | | |
|---|---|---|
| 1,769,834 | Harding | July 1, 1930 |
| 2,377,801 | Mills et al. | June 5, 1945 |
| 2,576,099 | Bray et al. | Nov. 27, 1951 |
| 2,686,838 | Dehn | Aug. 17, 1954 |
| 2,693,593 | Crosman | Nov. 2, 1954 |
| 2,700,421 | Blodgett | Jan. 25, 1955 |